Aug. 16, 1938.  S. C. POWELL  2,127,048
METHOD OF MAKING MOWER GUARDS
Filed Aug. 9, 1935

VIEW A-A.

VIEW B-C.

VIEW B-D.

Inventor
Stanley C. Powell
By V. J. Lumague
Att'y.

Patented Aug. 16, 1938

2,127,048

UNITED STATES PATENT OFFICE 2,127,048

METHOD OF MAKING MOWER GUARDS

Stanley C. Powell, Chicago, Ill., assignor to International Harvester Company, a corporation of New Jersey Application August 9, 1935, Serial No. 35,403

2 Claims. (Cl. 29—148.3)

The invention relates to the construction of a guard of the type used in mowers and other harvesters. The invention also embraces a novel method for producing or forming the guard.

Heretofore such guards, which include a body having a point and a lip, were cast in one piece, leaving the usual space between the lip and top of the guard body to form the knife passage. This passage is awkward to machine and finish. Further, the top surface of the body is difficult to finish in providing the ledger mount surface. Consequently, these guards are costly to produce.

The main object of the present invention is to provide a guard of standard form but constructed in a manner to facilitate its manufacture and lessen its cost.

Another object is to provide a forged guard which can be more accurately made than a cast guard to eliminate expensive machining and finishing operations.

Still another object is to provide a three-piece guard in which the body, point, and lip are separately forged and then assembled in a holding fixture wherein all parts are united by a single welding operation to form a unitary one-piece guard.

Another important object is to provide a novel method of forming these guards.

Other important objects will become apparent to those skilled in this art as the disclosure is more fully made.

Briefly, these objects are attained in separately forging the guard in three pieces, to wit: the body, the point, and the lip. Each part as it is forged will be appropriately coined especially along the faces of the parts which are to abut each other in uniting the parts. Further the body will have its ledger surface appropriately formed in the forging operation. The point is then held in a fixture with its rear coined and flush face exposed. The lip is then placed with its front end on the front end of the body, both of these latter two parts having front ends coined and lying flush in a common plane to form a mating edge with the rear end face of the point. A fixture holds the lip and body in proper position so that by means of a single electric welding operation the lip and body are welded simultaneously to the point to unite the three parts and form the completed guard which requires no machining or expensive finishing. All that need be done after the welding operation is to grind off the flash left by the weld, where the parts abut and are joined.

In the sheet of drawings forming part of this disclosure, there has been illustrated a practicable embodiment of the invention, wherein.

Figure 5:
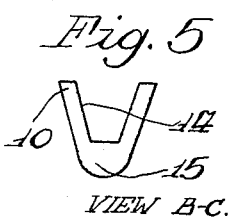
Figure 5 is a vertical elevational view of the front end of the body viewed from the line B—C of Figure 1, looking in the direction of the arrows; and, Figure 6 is a vertical elevational view of the front end of the lip viewed from the line D—B of Figure 1, looking in the direction of the arrows.
Figure 6:

The guard is formed in three separate forged pieces. The first part is the body 10 having a heel portion 11 for attachment to a cutter bar; and a flat top ledger surface 12. The body also includes the spacer wings 13 extending oppositely in the usual way. The front end of the body, as shown in Figure 5, is hollowed out at 14 to save metal and to provide a reduced, vertical, flat face or surface 15.

The second part, also formed as a forging preferably, is the lip 16 which has its front end 17 formed with a portion providing a flat surface disposed in the direction of the smallest dimension of the lip and adapted to lie in a common plane with the surface 15 of the body piece. This piece 16 may include a notched portion 18 for locating a standard ledger plate on the body 10 and the surface 12, if one is to be used. It will be noted that the smallest dimension, in the present instance, refers to the shortest distance across the part whereat it is practicable to provide a face for welding, as will be later described.

The third part comprises the point 19 formed hollow or recessed at 20 to save metal and weight which provides a portion terminating in a face or surface 21 disposed in the direction of the smallest dimension of the point and substantially surrounding the recessed or hollow portion 20 which also may be disposed in the same plane with the faces 15, 17 heretofore mentioned, or in substantially the same or an abutting parallel plane.

It is now apparent that each of the three parts of a standard guard are first separately formed by forging which my include the usual coining operation to result in precision which will eliminate all machining and finishing operations. The ledger surface 12 on the body piece 10 is completed in the forging of the body part. Similarly, the lip 16 is completed in its forging and requires no subsequent finishing. The same is true of the point. In the coining step, care is taken, of course, in forming the faces 15, 17 and 21 so that they may lie in a common plane for a purpose presently to appear.

Figure 1:
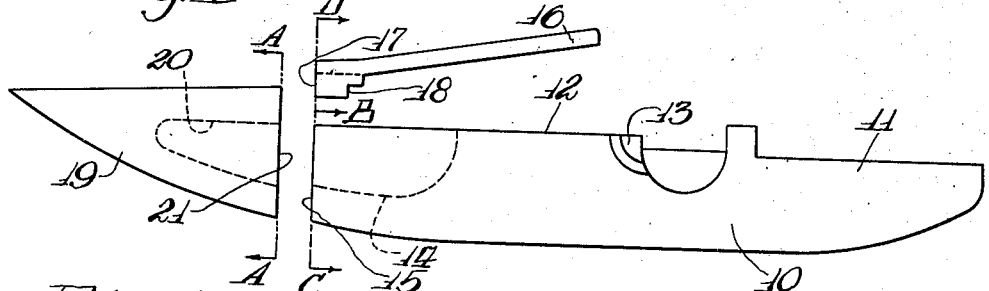
Figure 1 is a side elevational view of the guard with each of the three parts thereof shown detached, but in the general relative positions they assume in a finished guard.
Figure 2:
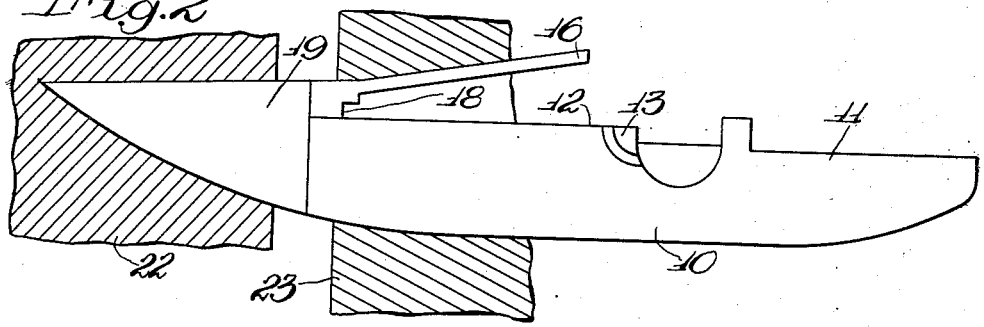
Figure 2 is a side elevational view of the guard with the three parts joined, the welding fixtures being generally indicated.
Figure 3:
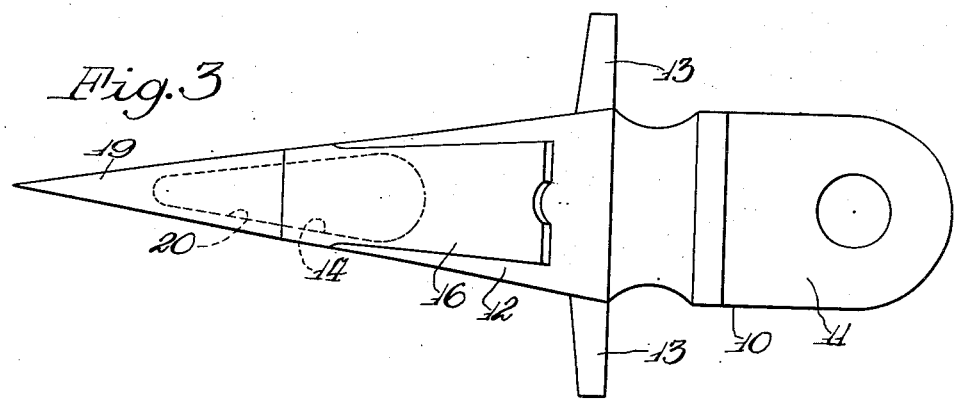
Figure 3 is a plan view of the finished guard.
Figure 4:
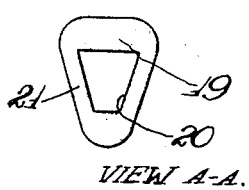
Figure 4 is a vertical elevational view of the rear end of the point viewed from the line A—A of Figure 1, looking in the direction of the arrows.

In the process of assembling the three separate parts, a holding fixture, indicated generally at 22, is provided to receive the tip or point 19, as shown in Figure 2, where it will be seen the rear face 21 thereof remains exposed and lies in a vertical plane. Next, the lip 16 with its front end is set on top of the front face of the body 10 with the forward face 17 of the lip lying flush in the same plane with the forward face 15 of the body. Then, in such position the lip and body parts are held in a suitable fixture indicated generally at 23 in Figure 3. It will be noted that the total areas of the faces 15 and 17 are substantially equal to the area of the face 21 of the point. The part 19 in fixture 22 and the parts 10, 16 in the fixture 23 are then moved in a relative manner to bring the flush faces 17, 15 into abutting relation with the face 21, as shown in Figure 2. By electric welding, these abutting faces are now joined so that the face 17 unites molecularly with the upper part of the face 21, thereby joining the lip to the point; and the face 16 to the lower part of the face 21 thereby joining the body to the point. While it is not necessary to weld the lower horizontal edge of the front end of the lip to the front top horizontal edge of the body, it, nevertheless, is found in practice that the flash creeps back some distance also to weld these horizontal surfaces together.

Thus, the three parts are united by welding and a unitary guard structure results. The provision of the faces of the parts across the smallest dimensions of the parts results in the shortest possible practicable junction between the parts, which provides for a comparatively quick welding operation. In completing the guard all that is necessary to be done is to grind off the flash edge left by the welding along the butt line where the parts are joined.

From this disclosure, it can now be seen that an improved guard is provided as an article of manufacture and that the same is formed by a novel method all in a manner in accordance with the objects of the invention heretofore recited.

It is the intention to cover all changes and modifications of the preferred example illustrated and described, which do not in material respects constitute departures from the invention as hereinafter claimed.

What is claimed is:

1. The method of forming a mower guard which comprises the steps of separately forming a point with a recessed portion at one end and a surface transversely of the point and substantially surrounding said recess, a lip with a surface formed transversely thereof, and a body with a recessed portion at one end and a surface transversely of the body and substantially surrounding said recess, bringing the parts together with their said faces abutting and simultaneously welding the surfaces on the lip and body to the surface on the point to unite the three parts, said surfaces on the point and body forming reduced areas to be welded.

2. The method of forming a mower guard which comprises the steps of separately forging a point with a face at one end, forging a lip with a face at one end, forging a body with a face at one end, said faces disposed in a plane in the direction of substantially the smallest dimension of each part, supporting the point in a fixture with its face exposed, placing the lip on the body and supporting said two parts in a fixture with their faces lying in a common plane coincident with the aforesaid plane, locating the faces of the lip and body in abutting relation to the face on the point and simultaneously welding the lip and body faces to the face on the point.

STANLEY C. POWELL.